(12) United States Patent
Enoki et al.

(10) Patent No.: US 9,659,098 B2
(45) Date of Patent: May 23, 2017

(54) METHOD, COMPUTER PROGRAM AND COMPUTER FOR DETECTING COMMUNITIES IN SOCIAL MEDIA

(71) Applicant: INTERNATIONAL BUSINESS MACHINES CORPORATION, Armonk, NY (US)

(72) Inventors: Miki Enoki, Kanagawa-ken (JP); Yohei Ikawa, Kanagawa-ken (JP); Raymond Harry Rudy, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 219 days.

(21) Appl. No.: 14/363,161

(22) PCT Filed: Nov. 22, 2012

(86) PCT No.: PCT/JP2012/080320
§ 371 (c)(1),
(2) Date: Jun. 5, 2014

(87) PCT Pub. No.: WO2013/094361
PCT Pub. Date: Jun. 27, 2013

(65) Prior Publication Data
US 2014/0337343 A1    Nov. 13, 2014

(30) Foreign Application Priority Data
Dec. 19, 2011   (JP) .................................. 2011-276995

(51) Int. Cl.
*G06F 7/02* (2006.01)
*G06F 17/30* (2006.01)
(Continued)

(52) U.S. Cl.
CPC ........ *G06F 17/30867* (2013.01); *G06F 17/30* (2013.01); *G06F 17/30554* (2013.01);
(Continued)

(58) Field of Classification Search
None
See application file for complete search history.

(56) References Cited

U.S. PATENT DOCUMENTS

| 7,644,144 | B1 * | 1/2010 | Horvitz ................. G06Q 10/10 709/203 |
| 2008/0097994 | A1 * | 4/2008 | Teramoto .......... G06F 17/30943 |

(Continued)

FOREIGN PATENT DOCUMENTS

| CN | 101278257 A | 10/2008 |
| JP | 2001014349 A | 1/2001 |

(Continued)

OTHER PUBLICATIONS

"Emotional Aware Clustering on Micro-blogging Sources," Koutsonikola, Vassiliki A. et al, 4th International Conference, Affective Computing and Intelligent Interaction, Oct. 9-12, 2011. Retrieved from https://www.researchgate.net/publication/221622172_Emotional_Aware_Clustering_on_Micro-blogging_Sources on Mar. 17, 2016.*

(Continued)

*Primary Examiner* — Bruce Moser
(74) *Attorney, Agent, or Firm* — Daniel C. Housley

(57) ABSTRACT

The present invention provides at least a method includes: extracting a plurality of partial communities from a plurality of users, based on the relationships of companion messages; computing a first degree of similarity for showing the similarity of the companion partial communities, based on the relationship of a user belonging to one partial community with a user belonging to the other partial community, from among the plurality of communities; computing a second degree of similarity for showing the similarity of companion partial communities, based on words within the messages sent by users belonging to both partial communities and under the condition that the first similarity be higher (Continued)

than a predetermined first threshold value; and creating an integrated community by integrating the companion partial communities under the condition that the second similarity be higher than a predetermined second threshold value.

13 Claims, 8 Drawing Sheets

(51) Int. Cl.
  *H04L 29/08* (2006.01)
  *G06Q 50/00* (2012.01)
  *H04L 12/58* (2006.01)

(52) U.S. Cl.
  CPC .. *G06F 17/30598* (2013.01); *G06F 17/30705* (2013.01); *G06Q 50/01* (2013.01); *H04L 51/32* (2013.01); *H04L 67/306* (2013.01)

(56) References Cited

U.S. PATENT DOCUMENTS

| | | | | |
|---|---|---|---|---|
| 2008/0222295 | A1* | 9/2008 | Robinson | G06F 17/30867 709/227 |
| 2009/0271247 | A1* | 10/2009 | Karelin | G06Q 10/10 705/319 |
| 2009/0292526 | A1* | 11/2009 | Harari | G06F 17/2765 704/9 |

FOREIGN PATENT DOCUMENTS

| | | |
|---|---|---|
| JP | 2006525601 A | 11/2006 |
| JP | 2008140174 A | 6/2008 |
| JP | 2008257512 A | 10/2008 |
| JP | 4369104 B2 | 11/2009 |
| JP | 2009-301334 | 12/2009 |
| JP | 2009-301335 A | 12/2009 |
| JP | 2010218353 A | 9/2010 |
| JP | 2010286868 A | 12/2012 |

OTHER PUBLICATIONS

"User Clustering in Microblogging and Feature Word Extraction from Clusters, Hatamoto et al, Proceedings of the Seventeenth Annual Meeting of the Associatiion for Natural Language Processing," Mar. 2011, pp. 280-283, included in application file Jun. 5, 2014.*

"Clustering of Users in Microblogs and Extraction of Characteristic Words from such Clusters," Norinobu Hatamoto et al, Proceedings of the Seventeenth annual Meeting of the Association for Natural Language Processing, Mar. 2011, starting at p. 280. English translation obtained Mar. 31, 2016.*

International Application No. PCT/JP2012/080320, International Search Report dated Dec. 18, 2012, 4 pages.

Long-Ting et al., "Community mining approach based on local optimization", English Abstract, Application Research of Computers, Aug. 2009, vol. 26, No. 8, 4 pages. DOI: 10.3969/j.issn.1001-3695.2009.08.014.

Rui-Kai et al., "Research on algorithm of community structure detection based on interest similarity", English Abstract, Research and Development, Railway Computer Application, vol. 19, No. 10, 5 pages. Copyright China Academic Journal Electronic Publishing House.

* cited by examiner (a)

(b)

(c)

(d)

(e)

METHOD, COMPUTER PROGRAM AND COMPUTER FOR DETECTING COMMUNITIES IN SOCIAL MEDIA

CROSS REFERENCE TO RELATED APPLICATIONS

This application claims priority under 35 U.S.C. 371 from PCT Application, PCT/JP2012/080320, filed on Nov. 22, 2012, which claims priority from the Japanese Patent Application No. 2011-276995, filed on Dec. 19, 2011. The entire contents of both applications are incorporated herein by reference.

BACKGROUND OF THE INVENTION

Field of the Invention

This invention is related to information processing technology, and more specifically it is related to technology for more quickly and more accurately detecting communities in social media (groups of social media users who share attributes such as hobbies and interests).

Description of the Related Art

In conjunction with the widespread use of social media, there exists demand in business for the extraction of communities and the hobbies and interests shared by those communities from information users have sent on social media. Various costs can be high when making the target all of the information on social media, so usually there is performed extraction of communities and related hobbies and interests from information sampled from the social media. In general, clustering methods are used as the technology for extracting the communities and related hobbies and interests. Specifically, words in the information are extracted, feature vectors computed, and clustering performed based on those vectors.

SUMMARY OF THE INVENTION

The first aspect of the present invention provides a computer-implemented method for clustering a plurality of users in social media, wherein the plurality of users each send messages. The computer-implemented method includes: extracting a plurality of partial communities from the plurality of users, wherein the plurality of partial communities are based on relationships of companion messages; computing a first degree of similarity for showing a similarity of companion partial communities, wherein the first degree of similarity is based on a relationship of a user belonging to a first partial community with a user belonging to a second partial community; computing a second degree of similarity for showing a similarity of companion partial communities, wherein the second degree of similarity is based on words in the messages sent by users belonging to the first and second partial communities and so that the first degree of similarity is higher than a predetermined first threshold value; and creating an integrated community by integrating the companion partial communities so that the second degree of similarity is higher than a predetermined second threshold value.

The second aspect of the present invention provides a computer system for clustering a plurality of users of social media, wherein the plurality of users each send messages. The computer system include: a memory for storing the messages; a processor device communicatively coupled to the memory; and a computation control means communicatively coupled to the memory and the processor device. The computation control means is configured to perform the steps of a method which include: extracting a plurality of partial communities from a plurality of users, wherein the plurality of partial communities are based on the relationships of companion messages; computing a first degree of similarity for showing a similarity of companion partial communities, wherein the first degree of similarity is based on the relationship of a user belonging to a first partial community with a user belonging to a second partial community, from the plurality of communities; computing a second degree of similarity for showing a similarity of companion partial communities, wherein the second degree of similarity is based on words in the messages sent by users belonging to the first and second partial communities and so that the first degree of similarity is higher than a predetermined first threshold value; and creating an integrated community by integrating the companion partial communities so that the second similarity is higher than a predetermined second threshold value.

The third aspect of the present invention provides a non-transitory computer readable storage medium tangibly embodying a computer readable program code having computer readable instructions which, when implemented, cause a computer device to carry out a method for clustering a plurality of users in social media, wherein the plurality of users each send messages, the method includes the steps of the method identified above.

DETAILED DESCRIPTION OF THE PREFERRED EMBODIMENTS

The following section describes in detail an optimal mode for executing this invention, based on the drawings. The following embodiment does not limit the invention according to the Scope of Claims, and the entire combination of characteristics described within the embodiment are not essential to solving means of the invention. This invention can be executed by many differing modes, and there is no reason that it should be interpreted with limitation to the content recorded for the embodiment. Furthermore, the entire combination of characteristics described in the embodiment is not essential to the solving means of the invention. Identical symbols are applied to the identical elements throughout the entire description of the embodiment (when not specified otherwise).

Figure 1:
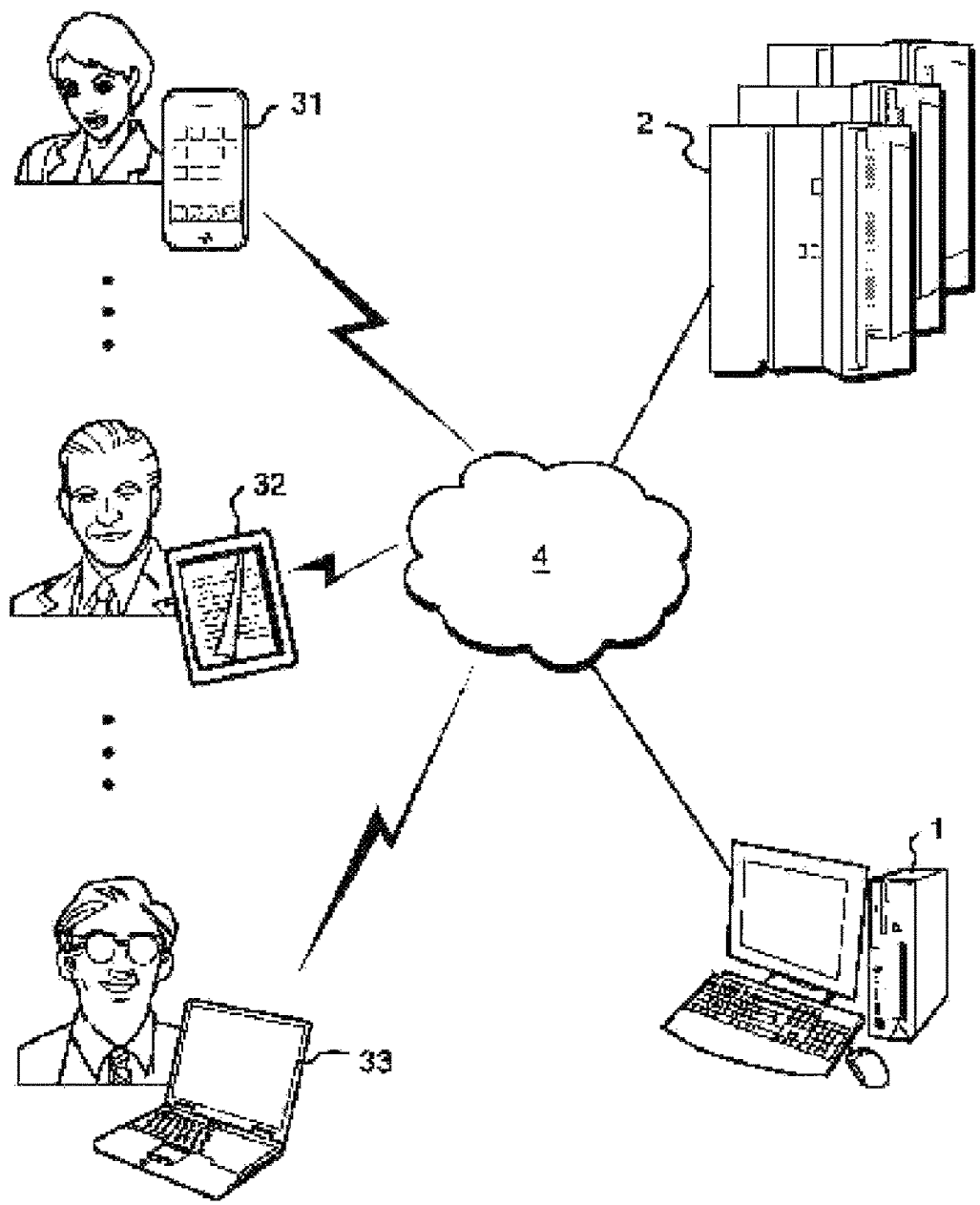
FIG. 1 is an overview drawing that explains the system of a microblog.

FIG. 1 is an overview drawing that explains the system of a microblog. This system includes a microblog server 2 and user terminals, and these are reciprocally connected for communications through Internet 4. The user terminals can be any mode of computer providing a communications function. For example, smartphone 31, tablet 32 and personal computer (notebook type) 33 are shown in the drawing, but in addition, though not shown, there can be utilized such as a personal data assistant (PDA, mobile information device), vehicle mounted computer or a netbook.

Figure 2:
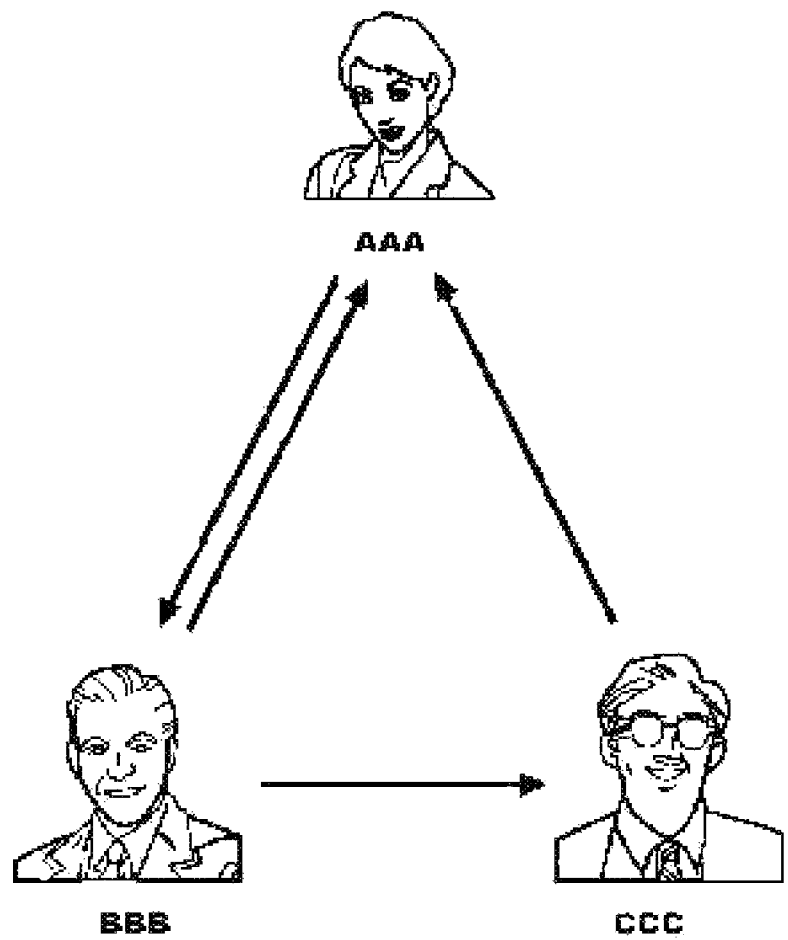
FIG. 2 is an overview drawing that explains the relationship of followers and followed for a microblog.

FIG. 2 is an overview drawing that explains the relationship of followers and followed for a microblog. A user of the microblog can register in advance other users who share the same hobbies or interests, and the user can automatically receive messages sent by those other users. This registration process is called "to follow," and the related relationship can be of two kinds: wherein the both involved users follow each other, and wherein only one of the users unilaterally follows the other user. For example, the arrows in FIG. 2 show that user AAA and user BBB are reciprocally following each other, while user BBB is unilaterally following CCC, and user CCC is unilaterally following user AAA.

Figure 3:
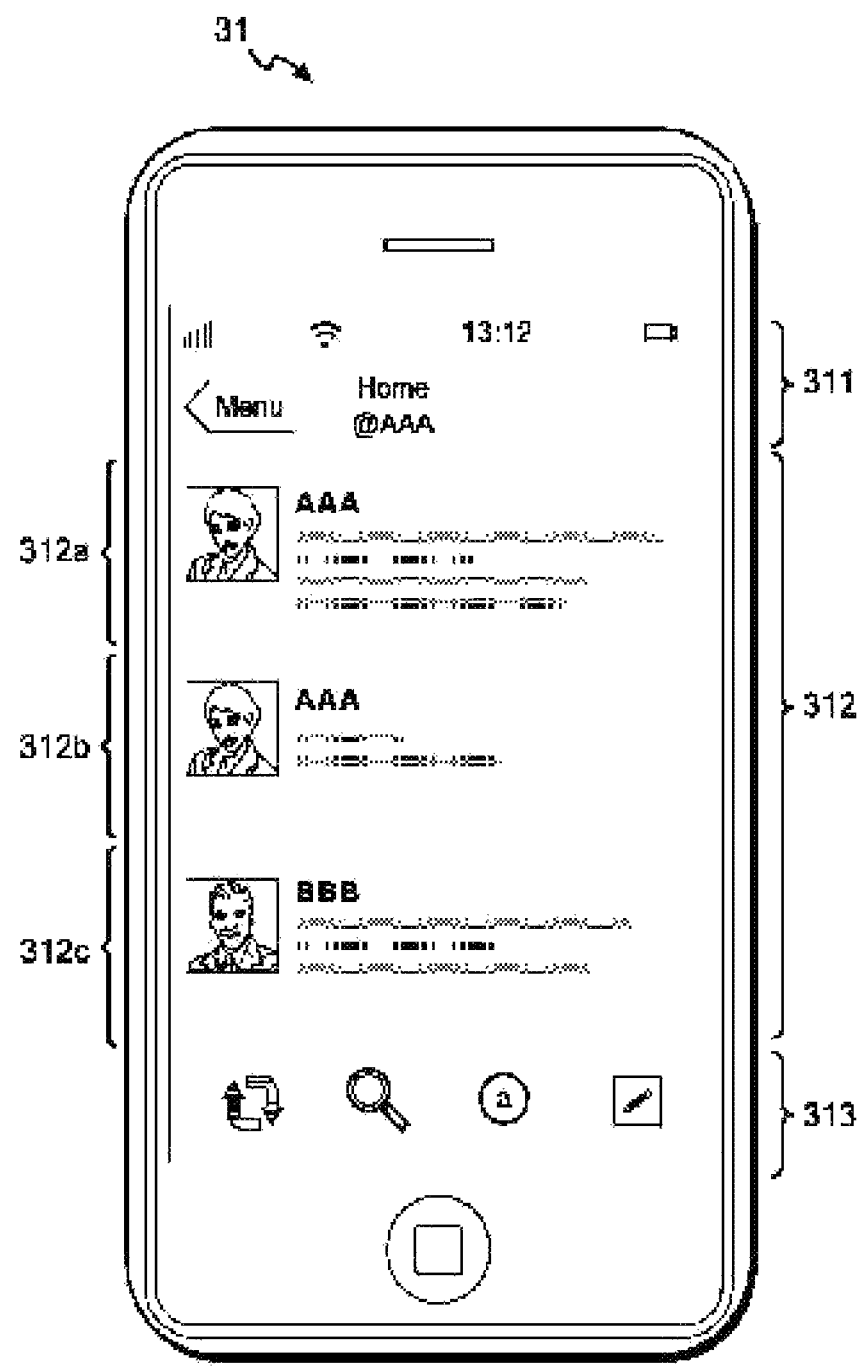
FIG. 3 is an explanatory drawing of a smart phone functioning as a user terminal, and of the related screen display.

FIG. 3 is an explanatory drawing of smart phone 31 functioning as a user terminal, and of the related screen display. The screen of a microblog application is displayed on the touch screen of smartphone 31, and the application screen is divided into, in order from the top, home component 311, timeline component 312, and operating component 313. Within home component 311 there is displayed a menu button and an indicator that timeline component 312 is the timeline of user AAA. Within the timeline component 312 there is displayed, in order from the top, message components 312a and 312b from user AAA, as well as message component 312c from user BBB. The message components 312a-312c is displayed along a time series. Specifically, message component 312a at the highest position corresponds to the newest message.

Figure 4:
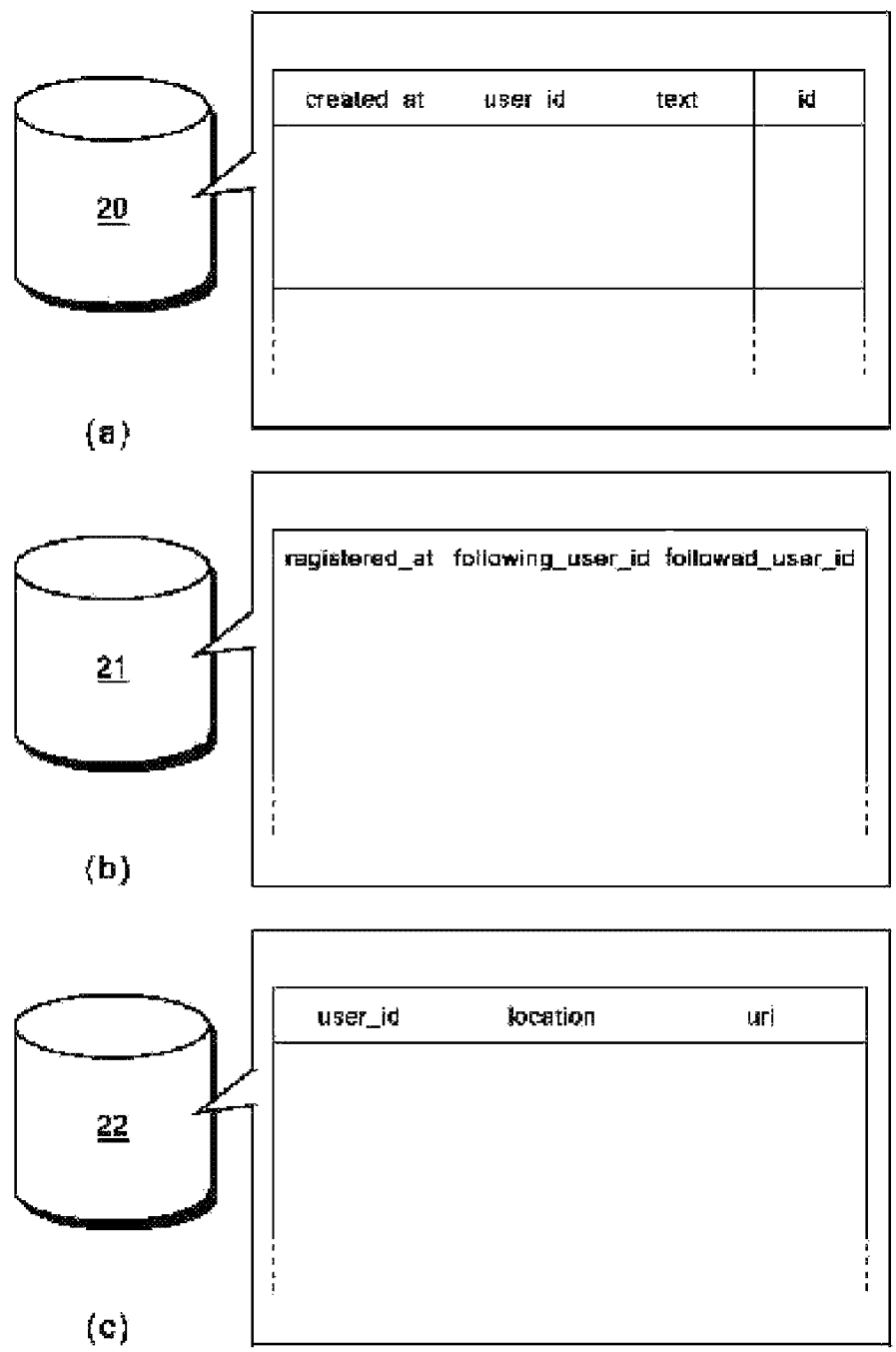
FIG. 4 is an explanatory drawing of the data structure for data stored in the hard disk device of a microblog server.

FIG. 4 is an explanatory drawing of the data structure for data stored in hard disk devices 20, 21 and 22 of a microblog server 2. Within the message table (FIG. 4 (*a*)) stored in hard disk device 20, there is provided a send time (created_at) that shows the date and time at which each message was sent, a message ID (id) that identifies each message, a user ID (user_id) that identifies the user who sent the message, and the text (text), which is the content of the message. Furthermore, it is possible to set a character count limit for the text (such as 140 characters or less). Concurrently, within user relationship table (FIG. 4 (*b*)) stored in hard disk device 21, there is provided a registration time (registered_at) that shows the date and time at which a following relationship was registered, a follow origin user ID (following_user_id) that identifies the user being the origin of the following, and a follow destination user ID (followed_user_id) that identifies the user being the destination of the following.

Comparatively, within the profile table (FIG. 4 (*c*)) stored in hard disk 22, there is provided a user ID for identifying each user (user_id), a name for each user (not shown in drawing), location information showing the location (location), and URL information as the related web page address (url).

Figure 5:
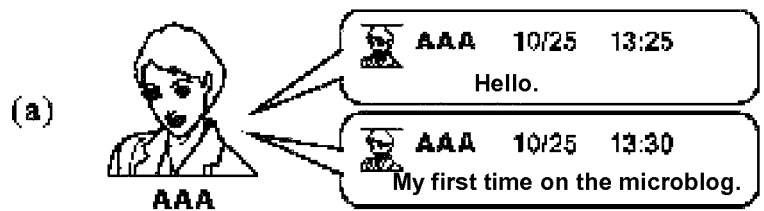
FIG. 5 is an explanatory drawing of the types of messages sent.
Figure 5:
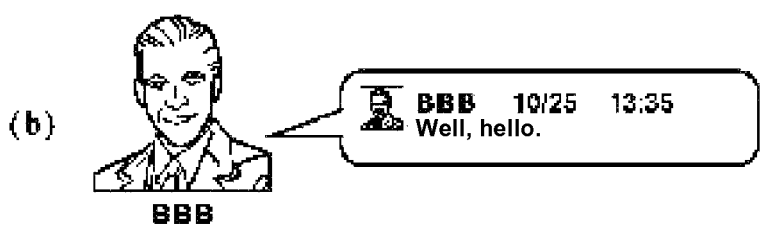
Figure 5:
Figure 5:
Figure 5:

FIG. 5 is an explanatory drawing of the types of messages sent. FIG. 5 (*a*) describes a normal message. Here, user AAA has sent messages to her own timeline, and these messages are displayed not only in the timeline of user AAA but also in the timelines of those following user AAA (in the example of FIG. 2, user BBB and user CCC). FIG. 5 (*b*) describes a reply message. A reply message is a response to a specific message, and it is displayed in the respondent's timeline as well as in the timelines of those following the respondent as well as those following the reply destination user. Here, user BBB sends the reply message "Well, hello." as a response to the message of user AAA, and this reply message is displayed in the timeline of user BBB as well as the timelines of users following user BBB (in the example of FIG. 2, user AAA).

FIGS. 5 (*c*) and 5 (*d*) both describe a type of copy message, and they show forms of resending the user AAA origin message "My first time on the microblog," which was displayed in the timeline of user CCC, as a copy message. In both cases, the copy message is displayed in the timelines of users who follow user CCC (in the example of FIG. 2, user BBB), but with the mode shown in FIG. 5 (*c*) it is displayed in timelines of users who follow user CCC with the name of original poster user AAA, and with the second mode shown in FIG. 5 (*d*) it is displayed with the name of the forwarding poster user CCC. FIG. 5 (*e*) describes a quote message. This shows a form of resending the user AAA origin message "My first time on the microblog," which was displayed in the timeline of user CCC, as a message that quotes the original and also includes the user CCC new comment "Welcome!" The quoted message is displayed in the timelines of users who follow user CCC.

Figure 6:
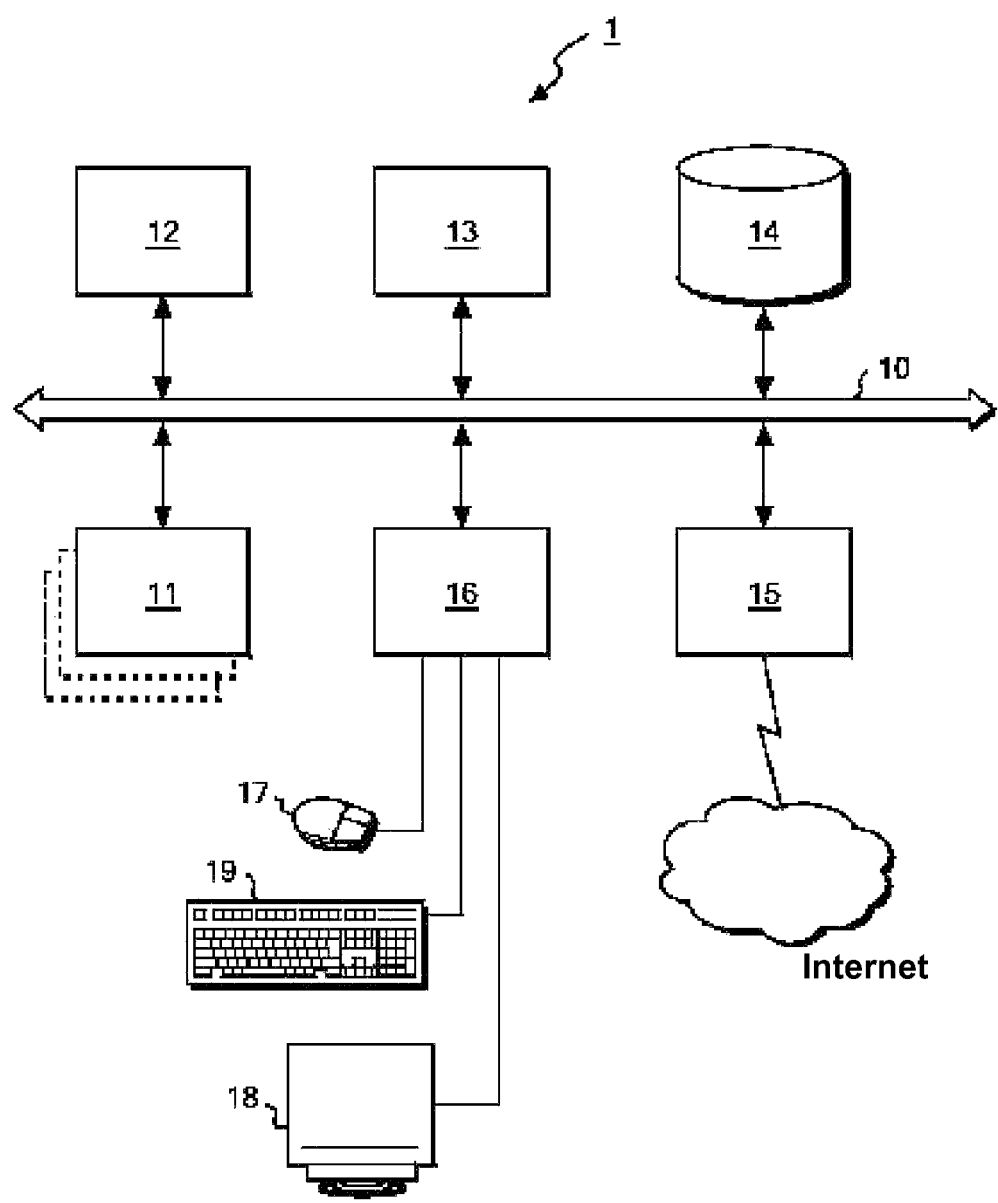
FIG. 6 is a block diagram that explains the hardware structure of a computer.

FIG. 6 is a block diagram that explains the hardware structure of a computer. The hardware structure of computer 1 includes (low speed or high speed) bus 10, CPU (central processing unit) 11 connected to bus 10, RAM (random access memory, a memory device) 12, ROM (read only memory, a memory device) 13, HDD (hard disk drive, a memory device) 14, communications interface 15, and input-output interface 16. There is further provided mouse 17, flat panel display (display device) 18, and keyboard 19 connected to input-output interface 16. Computer 1 is described as that which has adopted a general personal computer architecture, but components such as CPU 11 and HDD 14 can be multiplexed when higher data processing performance and availability. It is also possible to utilize various other types of computer systems in place of a desktop computer.

The software structure of computer 1 includes an operating system (OS) offering foundational functions, application software that utilize the functions of the OS, and driver software for the input-output devices. Each of these pieces of software is loaded into RAM 12 along with various data and is executed by such as CPU 11. Computer 1 as a unit executes the processing shown in FIG. 7.

Figure 7:
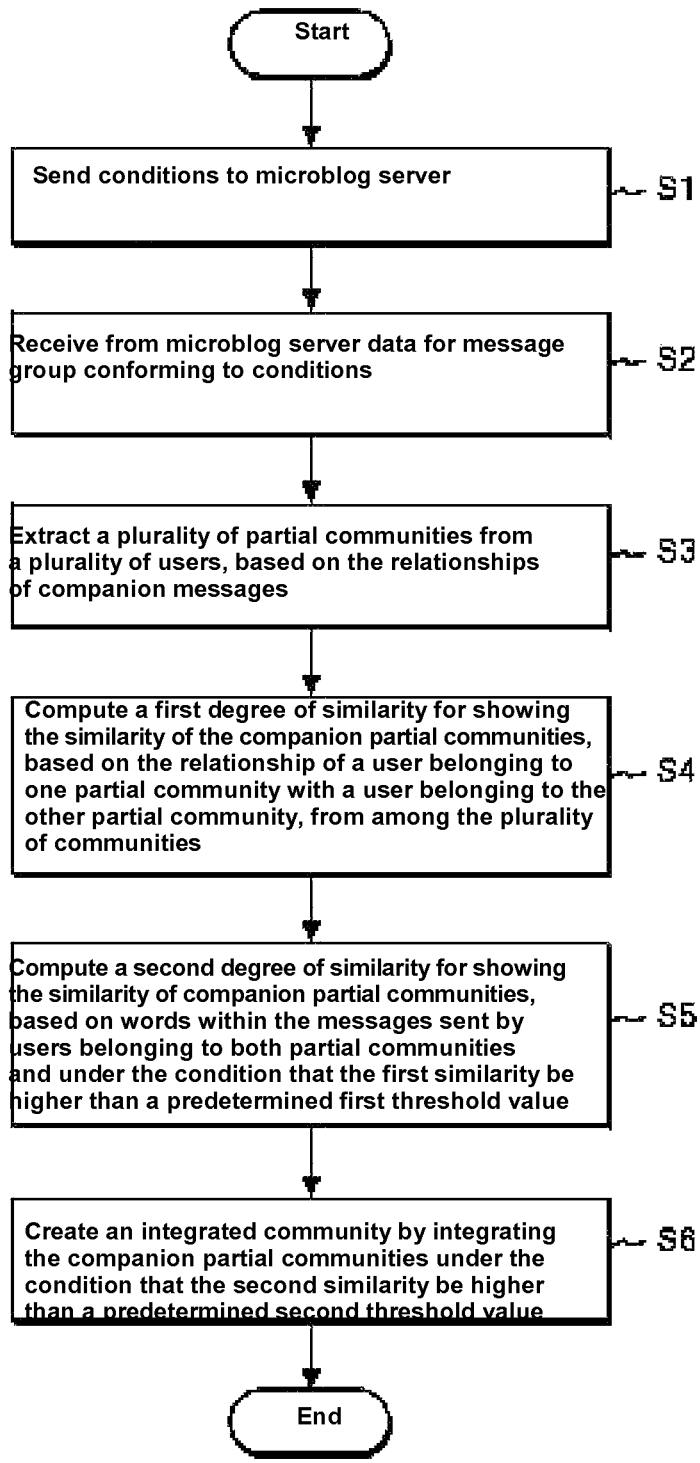
FIG. 7 is a flow chart that explains the processing executed by the computer.

FIG. 7 is a flow chart that explains the processing executed by the computer. First, a condition is sent from computer 1 to microblog server 2 (S1). This can be a condition that specifies the time period during which the message was sent, one that specifies that a particular keyword be included within the message, one that specifies only replies or resent messages, or one that combines these parameters. Next, computer 1 receives from microblog server 2 data for a group of messages that conform to the above stated condition (S2). At this time, it is acceptable to concurrently receive the data for the message group conforming to the condition (FIG. 4 (*a*)), and data about the users related to these messages (FIG. 4 (*b*)), as well as the profiles of the users related to the messages (FIG. 4 (*c*)). This received data is stored in HDD 14 of computer 1.

Figure 8:
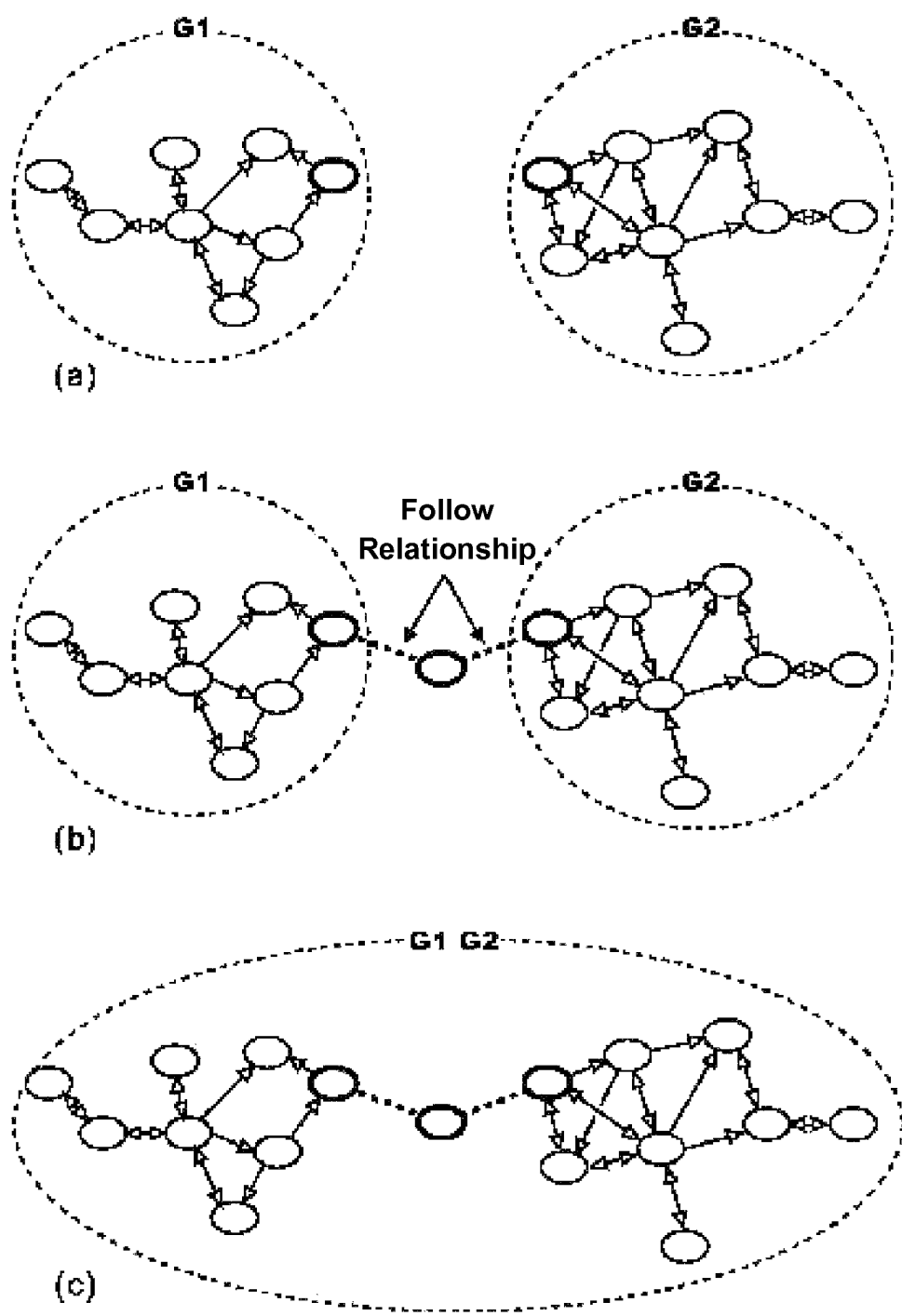
FIG. 8 is an explanatory drawing of the process of generating an integrated community from partial communities.

Next, a plurality of partial communities is extracted from the plurality of users, based on the relationships between the companion messages (S3). Here, the messages are other messages sent by other users in response to a single message sent by a single user; in other words, they are any of: reply messages (FIG. 5 (b)), copy messages (FIG. 5 (c) and FIG. 5 (d)), and quote messages. This extraction performs a deep priority search of the network of users defined by the relationship between the single message sent by a single user and the other messages, and therefore it extracts a partial network with a strong connected component. FIG. 8 (a) shows G1 and G2 each extracted as a partial network. Each circle within each of G1 and G2 shows an individual user, and the arrows show message exchange between the users.

Next, based on the relationship between a user belonging to a partial community and a user belonging to another partial community, there is computed a first similarity that shows the similarity of the community companions. Here, the user belonging to one partial community and the user belonging to the other partial community are evaluated for how many steps are needed for a following or followed relationship, and from that the number of steps is computed, and, for example, the related inverse is made the degree of similarity. FIG. 8 (b) shows that partial network G1 and partial network G2 can link the two partial communities with two steps through a third user (a single person), being a following/followed relationship to the third user with a user belonging to the one partial community and a following/followed relationship to the third user with a user belonging to the other partial community. Moreover, the degree of similarity is ½ (the inverse of 2). It is also acceptable to compute the first similarity based on the relationship of the profile information for a user belonging to the one partial community with the profile information for a user belonging to the other partial community. For example, similarity can be set higher for companion users having the same country or administrative district, which is shown in the location information; or, similarity can be set higher for companion users that have a partial or fully matching URL.

Next, based on words within the messages sent by the user who belongs to both partial communities and under the condition that the first similarity be higher than a predetermined first threshold (⅓, for example), there is computed a second degree of similarity that shows the similarity of both partial community companions (S5). Here, the second similarity is computed based on whether or not characteristic words within the message sent by a user belonging to the one partial community are similar to characteristic words within the message sent by a user belonging to the other partial community. Furthermore, the deep priority search for the characteristic word is performed by extracting using feature vector. It is also acceptable to execute <tf*idf>.

In another embodiment of the present invention, messages can include other messages sent by other users in response to a single message received from a single user, and the step for extracting can extract a plurality of partial communities from the plurality of users based on whether or not the companion messages correspond to said single message from a single user and other messages received in response to said single message. Furthermore, the step for extracting can be a <strong connected component>, or it can be <p-clique>.

Additionally, the social media can store user profile information, and the step for computing the first similarity can compute the first similarity based on the relationship between the profile information of a user belonging to one partial community and the profile information of a user belonging to the other partial community.

Moreover, the social media can offers a function for a certain user to follow a certain other user, and the step for computing the first similarity computes the first similarity based on the following/followed relationship between a user belonging to one partial community and a user belonging to the other partial community. Furthermore, the first similarity can show whether or not there is a following/followed relationship between a user belonging to one partial community and a user belonging to the other partial community through some other user, an the step for computing the second similarity can compute the second similarity based on the following/followed relationship between a user belonging to one partial community and a user belonging to the other partial community.

In another embodiment of the present invention computing the second similarity can compute the second similarity based on whether or not a characteristic word within the message sent by a user belonging to one partial community is similar to a characteristic word within the message sent by a user belonging to the other partial community. Here, the characteristic word can be extracted using feature vectors <tf*idf> of the messages of the community.

Furthermore, the messages can be messages sampled from those posted on social media under prescribed conditions. Moreover, the messages can also be messages sampled from those posted within a prescribed time period on social media under conditions that include a prescribed keyword. Additionally, the social media can be a microblog.

In addition, the computer that hosts to social media can be connected through a network to a computer that clusters a plurality of users, and further provided a step for the clustering computer to receive messages sent from the hosting computer in response to a prescribed condition request from the clustering computer. There can be further comprising a step for storing the received messages in a memory means of the clustering computer.

The method can further include a step for outputting the integrated community through use of a graphical user interface. At such time, the integrated community can be output along with the characteristic words.

Next, under the condition that the second similarity be higher than a predetermined second threshold, there is created an integrated community by integrating the companion partial communities (S6). FIG. 8 (c) shows the condition in which partial networks G1 and G2 have been integrated, thereby generating integrated community G1-G2. Integrated community G1-G2 can be output using a graphical user interface on flat panel display 18, and it can be output with the characteristic words.

This invention is able to take the form of an embodiment which is entirely hardware or of an embodiment that in entirely software or of an embodiment that includes elements of both hardware and software. In a preferable embodiment, while not being limited to the following, this invention is executed by software that includes firmware, permanent software, microcode or syntax parsing pico-code.

Furthermore, this invention can adopt the mode of a computer, or discretionary command execution system, or a computer program or computer readable medium that provides program code for use related to such. In fulfilling the purpose of this invention, the computer readable medium can be a discretionary device capable of housing, storing, communicating, or propagating a program for a discretionary command execution system, apparatus or device or for related use. Specifically, the previously mentioned syntax parsing control module structures this discretionary command execution system or "computer."

The medium can be an electronic, magnetic, optical, electromagnetic, infrared or semiconductor system (or apparatus or device) or propagation medium. As examples of a computer readable medium, there can be offered a semiconductor or solid memory, magnetic tape, mountable-removable computer diskette, random access memory (RAM), read only memory (ROM), rigid electromagnetic disk, or optical disc. According to the current examples of an optical disc, there can be a compact disc read-only memory (CD-ROM), a compact disc readable-writable memory (CD-R/VV), and a DVD.

For a data processing system suitable for storing, executing or both storing and executing program code there can be offered at least one processor directly or indirectly linked to a memory element through a system bus. For this memory element, there can be offered a local memory or bulk memory device used during the process of actual execution of the program code, or, in order to reduce the number of times there must be reading form the bulk memory device during execution, a cache memory that provides temporary storage for at least a portion of the program code.

An input-output device or I/O device (such as a keyboard, display, and pointing device, although there is no limitation to such) can be linked to the system directly or through an intermediary I/O controller.

Furthermore, a network adapter can be linked to the system, and the data processing system can be arranged to connect to another data processing system, or a remote printer or a memory device, through the intermediation of a private or public network. A portion of currently obtainable network adapters are a modem, cable modem, and Ethernet® card.

The invention claimed is:

1. A computer-implemented method for clustering a plurality of users in social media, wherein the plurality of users each send messages, the computer-implemented method comprising the steps of:
    extracting a plurality of partial communities from the plurality of users, wherein the plurality of partial communities are based on relationships of companion messages, which are connected by sending, replying, or forwarding between users in the plurality of users;
    computing a first degree of similarity for showing a similarity of companion partial communities, wherein the companion partial communities are based on the relationship of users with other users, and wherein the first degree of similarity is based on a relationship of a user belonging to a first partial community with a user belonging to a second partial community;
    computing a second degree of similarity for showing a similarity of companion partial communities, wherein the second degree of similarity is based on words in the messages sent by users belonging to the first and second partial communities and so that the first degree of similarity is higher than a predetermined first threshold value; and
    creating an integrated community by integrating the companion partial communities so that the second degree of similarity is higher than a predetermined second threshold value, wherein the social media offers a function for a certain user to follow a certain other user, and wherein computing the first degree of similarity is based on a relationship between a user belonging to the first partial community and a user belonging to the second partial community.

2. The computer-implemented method according to claim 1, wherein:
    the messages include other messages sent by other users in response to a single message received from a single user; and
    extracting the plurality of partial communities from the plurality of users based on whether the companion messages correspond to said single message from the single user and other messages received in response to said single message.

3. The computer-implemented method according to claim 1, wherein each of the plurality of partial communities extracted in the step for extracting is a strong connected component.

4. The computer-implemented method according to claim 1, wherein:
    the social media stores user profile information; and
    computing the first degree of similarity is based on the relationship between the profile information of a user belonging to the first partial community and the profile information of a user belonging to the second partial community.

5. The computer-implemented method according to claim 1, wherein computing the second degree of similarity is based on whether a characteristic word in a message sent by a user belonging to the first partial community is similar to the characteristic word within a message sent by a user belonging to the second partial community.

6. The computer-implemented method according to claim 5, wherein the characteristic word is extracted by creating feature vectors for the message.

7. The computer-implemented method according to claim 1, wherein the messages are sampled under a prescribed condition from messages posted on the social media.

8. The computer-implemented method according to claim 7, wherein:
    a posting computer is connected through a network to a clustering computer that clusters the plurality of users; and
    the clustering computer receives messages sent from the posting computer in response to a prescribed condition request from the clustering computer.

9. The computer-implemented method according to claim 8, further comprising storing the received messages in a memory of the clustering computer.

10. The computer-implemented method according to claim 1, wherein the messages are clustered so that a prescribed keyword from the messages is posted on the social media in a prescribed time period.

11. The computer-implemented method according to claim 1, wherein the social media is a microblog.

12. The computer-implemented method according to claim 1, further comprising outputting the integrated community by using a graphical user interface.

13. A non-transitory computer readable storage medium tangibly embodying a computer readable program code having computer readable instructions which, when implemented, cause a computer device to carry out a method for clustering a plurality of users in social media, wherein the plurality of users each send messages, the method comprising:
    extracting a plurality of partial communities from the plurality of users, wherein the plurality of partial communities are based on relationships of companion messages, which are connected by sending, replying, or forwarding between users in the plurality of users;
    computing a first degree of similarity for showing a similarity of companion partial communities, wherein the companion partial communities are based on the relationship of users with other users, and wherein the first degree of similarity is based on a relationship of a user belonging to a first partial community with a user belonging to a second partial community;

computing a second degree of similarity for showing a similarity of companion partial communities, wherein the second degree of similarity is based on words in the messages sent by users belonging to the first and second partial communities and so that the first degree of similarity is higher than a predetermined first threshold value; and creating an integrated community by integrating the companion partial communities so that the second degree of similarity is higher than a predetermined second threshold value wherein the social media offers a function for a certain user to follow a certain other user, and wherein computing the first degree of similarity is based on a relationship between a user belonging to the first partial community and a user belonging to the second partial community.

* * * * *